(12) United States Patent
Sättele (10) Patent No.: US 11,789,887 B2
(45) Date of Patent: Oct. 17, 2023

(54) METHOD FOR DETECTING THE POSITION OF A BUS SUBSCRIBER

(71) Applicant: Conti Temic microelectronic GmbH, Nuremberg (DE)

(72) Inventor: Peter Sättele, Biberach/Riss (DE)

(73) Assignee: Conti Temic Microelectronic GmbH

( * ) Notice: Subject to any disclaimer, the term of this patent is extended or adjusted under 35 U.S.C. 154(b) by 21 days.

(21) Appl. No.: 17/628,755

(22) PCT Filed: Aug. 6, 2020

(86) PCT No.: PCT/DE2020/200067
§ 371 (c)(1),
(2) Date: Jan. 20, 2022

(87) PCT Pub. No.: WO2021/032256
PCT Pub. Date: Feb. 25, 2021

(65) Prior Publication Data
US 2022/0283977 A1    Sep. 8, 2022

(30) Foreign Application Priority Data
Aug. 20, 2019   (DE) .................... 10 2019 212 414.3

(51) Int. Cl.
*G06F 13/42* (2006.01)
*H04L 12/40* (2006.01)
(52) U.S. Cl.
CPC .............. *G06F 13/42* (2013.01); *H04L 12/40* (2013.01); *H04L 2012/40273* (2013.01)
(58) Field of Classification Search
CPC ................................ G06F 13/42; H04L 12/40
(Continued)

(56) References Cited

U.S. PATENT DOCUMENTS 2,138,161 A * 11/1938 Hansell ................ H03B 5/1835
                                                    333/219
2,728,048 A * 12/1955 Priedigkeit ............ G01R 27/02
                                                    324/600
(Continued)

FOREIGN PATENT DOCUMENTS

CN    101960328 A    1/2011
DE    10048745 C1    2/2002
(Continued)

OTHER PUBLICATIONS

Mondal et al., "Estimation of Frequency and Amplitude of Ring Oscillator Built Using Current Sources", Ain Shams Engineering Journal, Amsterdam, NL, Sep. 1, 2020, vol. 11(3), pp. 677-686, XP093029158.
(Continued)

*Primary Examiner* — Paul R. Myers
(74) *Attorney, Agent, or Firm* — RatnerPrestia (57) ABSTRACT

The invention relates to a method for detecting the position of a bus subscriber (2, 2a, 2b, 2n) of a bus system, in which a control device (1) and several bus subscribers (2, 2a, 2b, 2n) are provided. The bus subscribers (2, 2a, 2b, 2n) are respectively in a position (P1, P2, Pn) to be detected and are connected to the control device (1) via at least one line, the line to the respective bus subscriber (2, 2a, 2b, 2n) having a definable line length (L1, L2, Ln), and the position of a bus subscriber (2, 2a, 2b, 2n) is then detected. The control device (1) emits a signal by means of an oscillator (3) via the line to the respective bus subscriber (2, 2a, 2b, 2n) and the bus subscriber (2, 2a, 2b, 2n) responds. The frequency of the oscillator (3) is determined and a ratio of frequency and line length (L1, L2, Ln) is used to detect the position.

15 Claims, 5 Drawing Sheets

(58) Field of Classification Search
USPC .......................................................... 710/105
See application file for complete search history.

(56) References Cited

U.S. PATENT DOCUMENTS

| | | | | |
|---|---|---|---|---|
| 3,403,334 | A | * | 9/1968 | Hoote .................... G01R 27/32 324/645 |
| 3,516,025 | A | * | 6/1970 | Podell ...................... H01P 5/22 333/120 |
| 5,339,022 | A | | 8/1994 | Fleming et al. |
| 5,733,511 | A | * | 3/1998 | De Francesco .......... H05H 1/46 422/907 |
| 6,041,224 | A | * | 3/2000 | Wada .................... H01P 1/2039 333/204 |
| 7,076,694 | B2 | | 7/2006 | Schuster |
| 9,494,450 | B2 | | 11/2016 | Nagy |
| 11,009,877 | B2 | | 5/2021 | Hofmann et al. |
| 2003/0128039 | A1 | | 7/2003 | Watkins |
| 2003/0222654 | A1 | * | 12/2003 | Furse .................... G01F 23/284 324/543 |
| 2004/0098514 | A1 | * | 5/2004 | Schuster ................. H04L 43/50 370/257 |
| 2007/0014393 | A1 | * | 1/2007 | Jensen ..................... H04B 3/46 379/30 |
| 2007/0164830 | A1 | * | 7/2007 | Aikawa ................ H03B 5/1852 331/107 SL |
| 2007/0201583 | A1 | * | 8/2007 | Yen ....................... H04L 25/022 375/340 |
| 2010/0023663 | A1 | | 1/2010 | Bachhuber et al. |
| 2020/0092137 | A1 | | 3/2020 | Jerolm |

FOREIGN PATENT DOCUMENTS

| | | |
|---|---|---|
| DE | 102005055964 | 5/2007 |
| DE | 102014215005 | 2/2016 |
| DE | 102016212645 A1 | 1/2018 |
| DE | 102017208831 A1 | 11/2018 |
| EP | 1 198 094 | 4/2002 |
| EP | 2 804 010 | 11/2014 |
| WO | 2016184889 A1 | 11/2016 |
| WO | WO 2017/064280 | 4/2017 |

OTHER PUBLICATIONS

European Communication for European Application No. 20761515.4, dated Mar. 13, 2023 with translation, 14 pages.
English translation of the International Search Report of the International Searching Authority for International Application PCT/DE2020/200067, dated Dec. 1, 2020, 2 pages, European Patent Office, HV Rijswijk, Netherlands.
PCT International Preliminary Report on Patentability including English Translation of PCT Written Opinion of the International Searching Authority for International Application PCT/DE2020/200067, dated Feb. 17, 2022, 7 pages, International Bureau of WIPO, Geneva, Switzerland.
German Search Report for German Patent Application 10 2019 212 414.3, dated Jul. 29, 2020, 12 pages, German Patent and Trademark Office, Muenchen, Germany, with English partial translation, 10 pages.
Chinese Office Action for Chinese Application No. 202080058283.9, dated Mar. 30, 2023 with translation, 12 pages.
English translation of the International Search Report of the International Searching Authority for International Application PCT/DE2020/200053, dated Oct. 20, 2020, 3 pages, European Patent Office, HV Rijswijk, Netherlands.
PCT International Preliminary Report on Patentability including English Translation of PCT Written Opinion of the International Searching Authoirty for International Application PCT/DE2020/200053, dated Feb. 17, 2022, 7 pages. International Bureau of WIPO, Geneva Switzerland.
German Search Report for German Patent Application 10 2019 212 415.1, dated Jul. 29, 2020, 12 pages, German Patent and Trademark Office, Muenchen, Germany, with English partial translation, 22 pages.
Notice of Allowance for U.S. Appl. No. 17/628,786, dated Jun. 22, 2023, 12 pages.

* cited by examiner

METHOD FOR DETECTING THE POSITION OF A BUS SUBSCRIBER

The present invention relates to a method for detecting the position of a bus subscriber or bus subscribers and a bus system, in which the position of the bus subscriber or the bus subscribers is in particular detected on the basis of a method according to the invention.

Technological Background

Modern means of transportation such as motor vehicles or motorcycles are increasingly being equipped with driver assistance systems which, with the aid of sensor systems, capture the surroundings, detect the traffic situation and support the driver, e.g., by means of a braking or steering intervention or by outputting an optical or acoustic warning. Ultrasonic sensors, camera sensors, surround-view cameras, radar sensors, lidar sensors or the like are regularly deployed as sensor systems for capturing the surroundings. Conclusions regarding the surroundings can subsequently be drawn from the sensor data determined by the sensors, by means of which assistance functions for supporting the driver during parking and/or driving maneuvers can be realized.

The sensors are usually connected to a control device or a control unit or a controller (Electronic Control Unit, ECU) via a bus or a bus system as bus subscribers, wherein a bus is to be understood to be a system for data transmission between several (bus) subscribers via an in particular common transmission path. Furthermore, when installing or fitting the bus subscribers, e.g., several ultrasonic sensors or surround view cameras, it is particularly important to know the respective bus subscriber or installation position for the desired assistance function. Accordingly, it is necessary to know which sensor is arranged or installed in which position in the vehicle. The respective installation position can be detected or established, e.g., by means of an explicit configuration (e.g., by end-of-line programming, "DIP switches", etc.) or by carrying out "teaching" (e.g., by manually or automatically activating an identifiable feature on the bus subscriber, wherein said feature may always only be activated for one subscriber at a time). However, the explicit configuration or the teaching requires additional configuration steps when installing the sensors (which typically takes place at the end of the line or during servicing in vehicle construction), which cannot usually be automatically carried out by the system. Therefore, this type of position detection is not process-reliable and means additional time outlay and expenditure. Circuitry-related measures can additionally be taken such as coding the subscriber position by additional address information at the installation location (e.g., by additional address pins in the connector plug which are coded differently according to the position) or by wiring the bus line to a so-called "daisy chain", i.e., the connection to the downstream bus segment is "looped through" the bus subscriber circuit and can be actively interrupted by the circuit of the bus subscriber. However, due to the connection configuration, such a coding requires additional outlay at the input circuitry of the bus subscribers. In addition, the different wiring of the bus connectors for the individual bus subscribers requires increased production outlay and is, in addition, an additional source of errors.

Published Prior Art

Three-wire buses (power, bus, ground) or bus systems are known from the prior art, in which it is, e.g., possible to conduct the coding by a connection configuration. For example, an auto detection device for detecting a bus subscriber or sensor within an electronic sensor system is known from WO 2017/064280 A1, wherein the sensor system can be a parking sensor system having ultrasonic sensors. Up to 6 different configurations can be supported and detected by cyclically swapping the connections at the respective bus subscriber.

Problem of the Present Invention

The problem of the present invention consists of providing a method as well as a device for detecting the position of the bus subscribers of a bus system, by means of which the detection of position can be improved in a simple and cost-effective manner without additional component costs, and the disadvantages of the prior art can be overcome.

Solution to the Problem

The aforementioned problem is solved by the entire teaching of claim 1 as well as the alternative independent claims. Expedient embodiments of the invention are claimed in the subclaims.

In the case of the method according to the invention for detecting the position of a bus subscriber of a bus system, at least one control device and several bus subscribers are provided. The bus subscribers are respectively in a position to be detected and are connected to the control device via at least one line, in particular a line for data, signal, energy and/or message transmission. The line to the respective bus subscriber has a definable line length. The position of the respective bus subscriber is then detected in that the control device emits a signal (oscillator signal) or a pulse by means of an oscillator or an oscillator circuit via the line to the respective bus subscriber and the bus subscriber responds, i.e., the oscillator of the control device couples an oscillator signal into the bus system, which is then fed back by the bus subscriber. The control device can determine the frequency of the oscillator or the oscillator frequency which, in turn, varies in accordance with the line length so that a ratio of frequency and line length can be used to detect the position of the respective bus subscriber. The method according to the invention consequently provides a novel, autonomous position determination for bus subscribers on an in particular shared bus system ("shared medium"), which can be realized without manual interventions or additional pins on the sensor or elaborate wiring in the sensor. Accordingly, only a small amount of hardware is required, which can be realized, e.g., in sensor/ECU ASICs. In addition, a simple type of bus wiring of sensors is made possible, as a result of which individual lines from the sensor to the controller can be saved, resulting in turn in an economic advantage in vehicle construction. In addition, smaller controller plugs (e.g., 6 lines instead of 16 lines for 12 ultrasonic sensors) can be made possible. Furthermore, the number of bus subscribers to be measured is not limited.

According to a preferred embodiment of the present invention, the bus subscriber can be a sensor, in particular an ultrasonic sensor. For example, several ultrasonic sensors can be deployed as distance sensors in a vehicle in order to realize a parking assistant. The ultrasonic sensors are distributed in/on the vehicle to guarantee "all-round visibility". The respective installation positions can then be automatically detected by means of the method according to the invention, via the different line lengths to a central control device (such as, e.g., Electronic Control Unit, ECU, or Automated Driving Control Unit, ADCU). This considerably simplifies the installation of the ultrasonic sensors, as they do not have to be labelled any further when they are installed and the system can configure itself automatically afterwards. Furthermore, other vehicle sensors known from the prior art can also be provided as bus subscribers such as, e.g., a radar sensor, camera, lidar sensor or the like. Moreover, the method can be utilized with all types of "shared medium" bus systems, in which the connected bus subscribers are to be identified via their position on the bus, e.g., also with airbag sensors. Alternatively or additionally, an actuator could also be provided as a bus subscriber (e.g., in the case of networked lights or the like).

The bus subscribers can expediently each have different definable line lengths. As a result, the position can be detected in a particularly simple manner. Alternatively, said position can be determined on the basis of (relative) line lengths which can be estimated, or said position can be estimated via a measured signal strength. The line lengths do not have to be established absolutely, since the method can also be carried out on the basis of relative line lengths (e.g., sensor 1 has the largest line length, sensor 2 the second largest line length, etc.).

The oscillator can preferably be a ring oscillator which can start oscillating independently and does not require any reactance components such as capacitors or inductors. The ring oscillator can be embodied as a closed series connection with an odd or even number of inverters, an embodiment with an odd number of inverters not having a stable state or only having a very low stable state. In contrast, a so-called flip flop ("RS flip flop") having two stable states of the output signal can be generated by means of an even number of inverters.

The control device can expediently comprise a frequency measuring apparatus having a counter circuit and a gate circuit for establishing the frequency of the oscillator.

According to an advantageous embodiment of the invention, the control device and the bus subscriber respectively have an apparatus for accessing the bus or a bus transceiver for coupling in or feeding back the signal of the oscillator.

In a particular exemplary embodiment of the present invention, the oscillator signal, superimposed with the supply voltage of the bus subscriber (e.g., on a line), is coupled into the bus system and fed back via a signal line of the bus system. The control device and/or the bus subscriber can expediently have a switching apparatus, by means of which it can be decided whether a coupling in or feeding back of the signal of the oscillator takes place or not.

The bus subscriber, the position of which is to be detected can be placed in a state in which the installation position thereof can be detected, e.g., in the loopback state, while the remaining bus subscribers are at the same time placed in a state in which their installation positions cannot be detected, e.g., in the neutral state. For example, the bus subscriber, the position of which is to be detected can be placed in a measuring state in which the bus transceiver is switched on, while the remaining bus subscribers are placed in a neutral state in which the bus transceiver is switched off.

The ratio of oscillator frequency and line length can be expediently derived by comparing the oscillator frequencies for the respective bus subscribers or correlating them and assigning them to the bus subscribers according to their sizes and in accordance with the respective line lengths.

In addition, a method for detecting the position of a bus subscriber is claimed, in alternative independent or subordinate claims, which comprises the following method steps:

configuring a bus subscriber in a loopback state for a time period $T_{LB}$, configuring the remaining bus subscribers in a neutral state for a time period $T_{NEU}$, activating the oscillator for a time period $T_{OS}$ which is less than the time periods $T_{LB}$ and $T_{NEU}$, as well as establishing the resulting frequency (F) while the oscillator is active.

The method preferably further comprises the method steps of applying a correction factor read out from the bus subscriber (to correct the transit times of the pulses/signals between the control device and the bus subscriber due to disturbances or losses), as well as storing or recording the result, e.g., in a memory of the control device for later evaluation.

The method steps can be expediently carried out or repeated for all of the bus subscribers of the bus system in order to establish/detect the installation positions of all of the bus subscribers.

The stored results are preferably arranged in an ascending or descending order in particular and assigned to the respective bus subscribers in accordance with their line lengths, so that the installation position thereof can be established accordingly.

In particular, the methods according to the invention can also be a computer-implemented method, the term "computer-implemented method" within the meaning of the invention being understood to mean a sequence planning or procedure which is implemented or carried out on the basis of a computer. The data processor such as, e.g., a computer, a computer network, a controller or a control device, a microcontroller or microprocessor or another programmable control device known from the prior art can process data by means of programmable calculation specifications. With regard to the method, essential properties can be occasioned e.g., by a new program, new programs, an algorithm or the like.

The present invention claims, in alternative independent or in subordinate claims, a bus system having position detection of bus subscribers, the installation position being detected in particular on the basis of a method according to the invention. For this purpose, the bus system comprises a control device as well as several bus subscribers which are respectively in the position to be detected. The bus subscribers are connected to the control device via at least one line, the line to the respective bus subscriber having a definable line length and the position of the bus subscriber being detected in that the control device comprises an oscillator which emits a signal via the line to the respective bus subscriber, whereupon the bus subscriber responds. Furthermore, a frequency measuring apparatus for establishing the frequency of the oscillator or the oscillator frequency is provided, a ratio of oscillator frequency and line length being used for position detection.

DESCRIPTION OF THE INVENTION WITH REFERENCE TO EXEMPLARY EMBODIMENTS

The invention is explained in greater detail below with reference to expedient exemplary embodiments, wherein.

Figure 1:
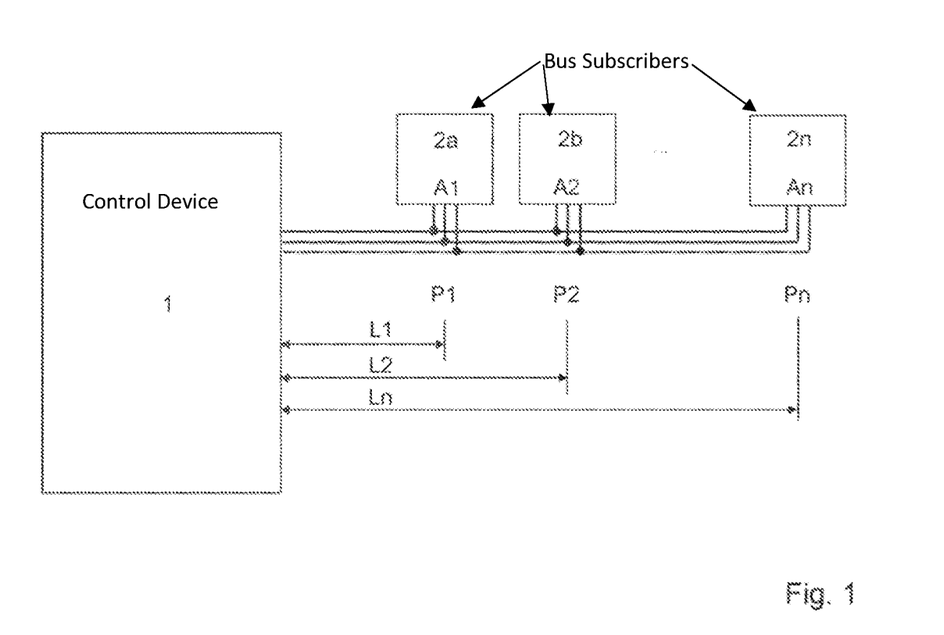
FIG. 1 shows a simplified schematic representation of a general plan of a bus system, in which the installation positions of the respective bus subscribers are automatically detected by means of the method according to the invention.
Figure 2:
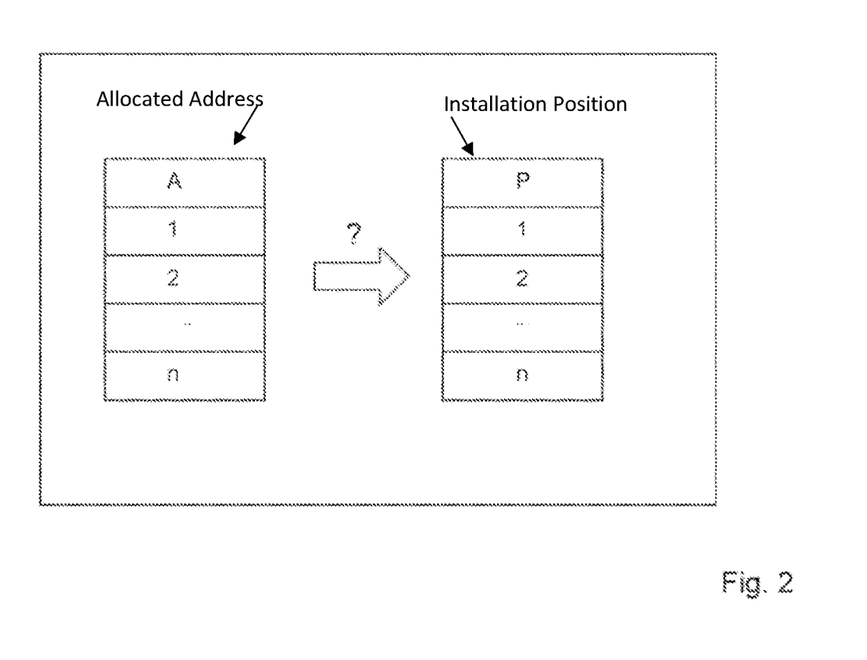
FIG. 2 shows a simplified schematic representation of the assignment of a sensor address within the bus system.

A general plan of a connection circuit or a bus system, in which several bus subscribers 2a, 2b . . . 2n, e.g., ultrasonic distance sensors, are connected to a common supply and communication bus of a control device 1 ("shared medium"), is depicted in FIG. 1. The bus subscribers 2a, 2b, 2n are arranged in a specific installation position P1, P2, Pn and each have a different line length L1, L2, Ln to the control device 1. For example, the bus or the lines can be embodied with three wires (supply voltage, communication signal and ground), so that the bus subscribers or (ultrasonic distance) sensors also have only three connection pins as well. In addition, the bus subscribers are allocated unique addresses A1, A2, An (e.g., serial numbers or the like), via which they can be addressed individually. In order to evaluate the sensor signals, the controller must know the mechanical installation position of the respective sensor, e.g., front left, front right and the like. For this purpose, the sensor address must be assigned to the (a priori unknown) actual position in the controller software, as depicted in a simplified manner in FIG. 2.

Figure 3:
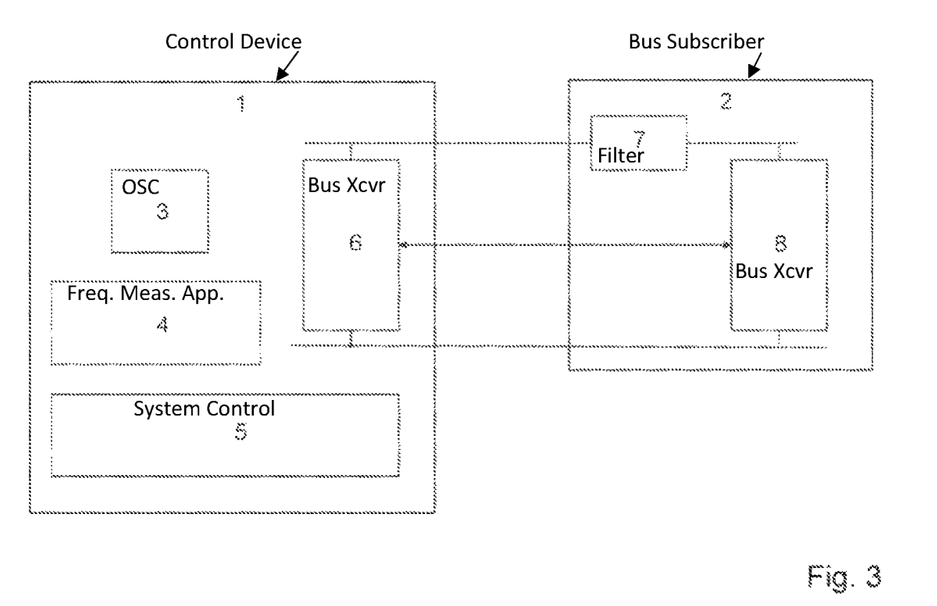
FIG. 3 shows a simplified schematic representation of a first embodiment of a control device and of a bus subscriber, the installation position of which is automatically detected by means of the method according to the invention.
Figure 4:
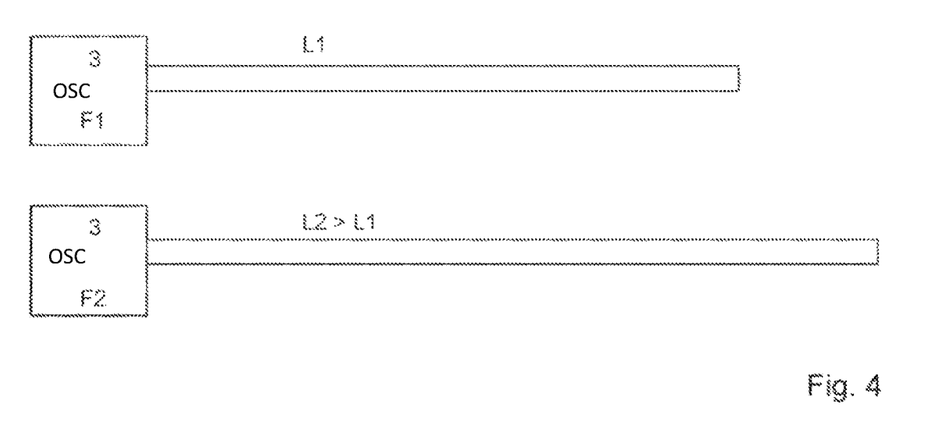
FIG. 4 shows a simplified schematic representation of the dependency between the line length and oscillator frequency.

FIG. 3 depicts a bus system according to the invention, which has a control device 1 which comprises an oscillator 3, a frequency measuring apparatus 4, an apparatus for accessing the bus or a bus transceiver 6 as well as a system control 5. Furthermore, the bus subscriber 2 comprises a filter 7 for the supply and a bus transceiver 8. The oscillator 3 is constructed in such a way that the signal loop to be constructed for this method via the bus is part of the frequency-establishing unit. Longer line lengths of the bus lead to lower frequencies F of the oscillator 3 because of the higher signal propagation times, as depicted in a simplified form in FIG. 4.

Figure 5:
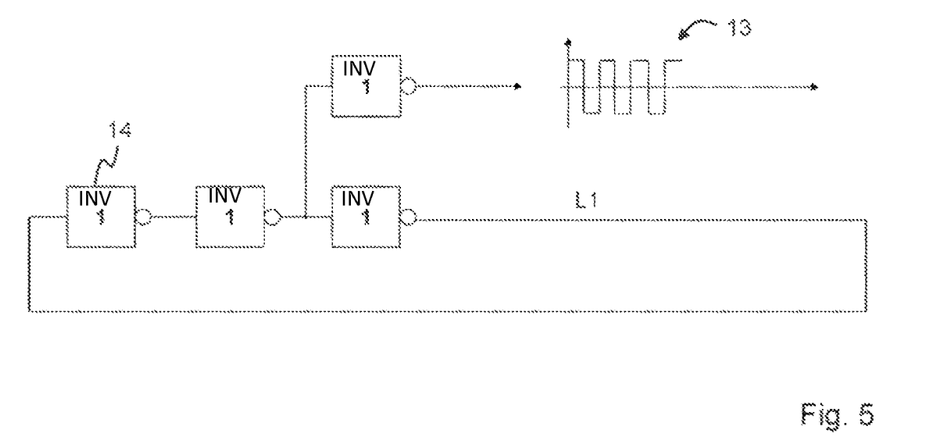
FIG. 5 shows a simplified schematic representation of a ring oscillator within an embodiment of the bus system according to the invention.

An example implementation of such an oscillator 3 is that of a ring oscillator according to FIG. 5. The absolute frequency F of the oscillator 3 does not necessarily have to be determined; rather the decisive factor is the frequency difference which is induced by different line lengths L1, L2, Ln to the respective bus subscriber 2, 2a, 2b, 2n. The absolute oscillator parameters only have to be kept sufficiently stable for the time period that is required for measuring all of the bus subscribers 2, 2a, 2b, 2n (usually a few seconds). The frequency measuring apparatus 4 realizes the function of a frequency meter and is set up in such a way that the frequency differences occurring can be captured to such an extent that the frequency differences resulting due to the line length differences are captured with sufficient accuracy. An absolute frequency measurement is not required in this case, but can be provided in particular in the case of similarly dimensioned line lengths L1, L2, Ln. Accordingly, either the absolute line lengths L1, L2, Ln or the line lengths L1, L2, Ln relative to one another of the individual bus subscribers 2, 2a, 2b, 2n can be used for the position detection.

The bus transceiver 6 mounted on the control device serves to couple in the oscillator signal onto the bus, and to receive the fed-back signal and to input said signal into the oscillator 3. The system control 5 serves to configure the system components on the control device and via appropriate communication via the bus on the bus subscriber. Furthermore, the system control serves to control the measurement sequence and to evaluate the measurement result.

Figure 6:
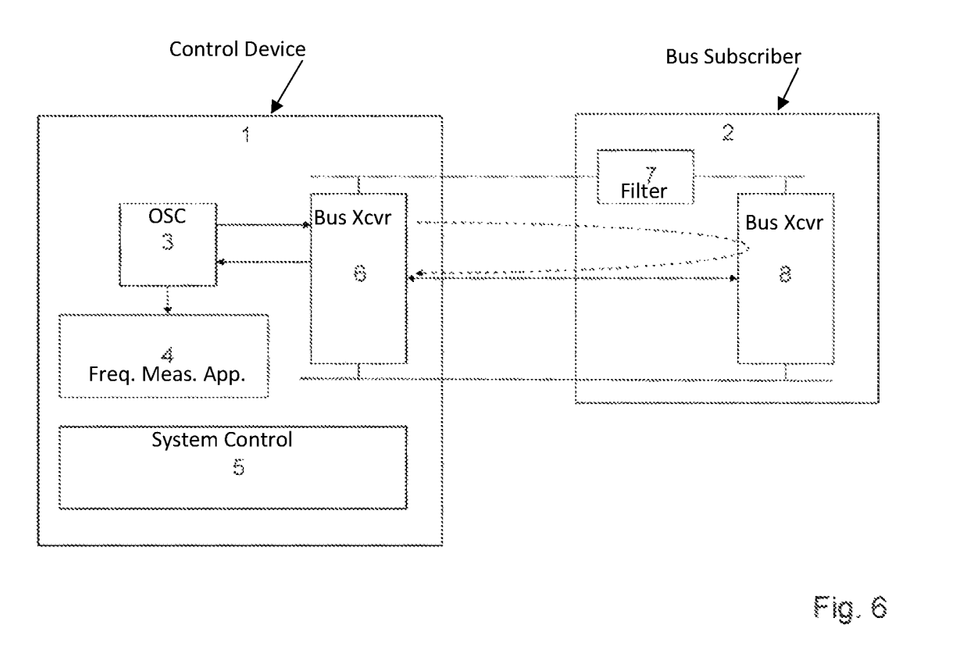
FIG. 6 shows a simplified schematic representation of a further embodiment of a control device and of a bus subscriber, the installation position of which is automatically detected by means of the method according to the invention.

The bus transceiver 8 of the bus subscriber 2 is designed in such a way that it can be switched into a loopback mode for a fixed or definable time period $T_{LB}$ and into a neutral state for a fixed or definable time period $T_{NEU}$. The loopback mode (according to FIG. 6) serves to ensure that a pulse received on the line is converted immediately into a corresponding pulse in the opposite direction for the defined time period, i.e., a state in which the installation position of the bus subscriber 2 can be detected. The bus transceiver 8 and the loopback mode are realized depending on the selected transmission protocol and are not the subject-matter of the invention. Once the defined time period $T_{LB}$ has expired, the bus subscriber 2 is to automatically return to the normal operating state. The neutral state of the bus subscriber 2 is designed in such a way that it does not react to signals on the bus (i.e., a state in which the position of the respective bus subscriber cannot be detected) for the specific time period $T_{NE}u$ (in a similar to corresponding order of magnitude as that for the loopback mode), but then automatically returns to the normal operating state.

For the course of the method, it is assumed that the bus subscribers 2, 2a, 2b, 2n can be addressed individually via identifiable addresses (e.g., by means of serial numbers or the like). Methods for determining addresses are likewise protocol-specific, sufficiently well-known and are therefore not the subject-matter of this method. In addition, it is assumed that the bus subscribers 2, 2a, 2b, 2n, if applicable, have a correction value which can be read out, which can compensate for manufacturing-specific fluctuations in those component properties that have an influence on the measured value. This value can, e.g., be determined during the production test under fixed conditions.

According to a preferred course of the method, a bus subscriber 2a (e.g., with address A1) can first be configured or placed in the loopback state, while the remaining bus subscribers 2b . . . 2n are configured or placed in the neutral state. The oscillator 3 can subsequently be activated for a specific time period which is less than the time period of the loop-back mode $T_{LB}$ and less than the time period of the neutral mode $T_{NEU}$. While the oscillator 3 is active, the resulting frequency F (oscillator frequency) can then be established or measured.

Optionally, a correction factor read out from the bus subscriber 2a to be measured can be applied in order to filter this out mathematically. The result can additionally be stored for later evaluation. Then method is subsequently repeated for all the other or the remaining bus subscribers 2b . . . 2n, the stored results being arranged, e.g., in an ascending or descending order. The order thus found reflects the physical order of the bus subscribers on the bus, with which these can then be assigned to the corresponding positions P1, P2, Pn or line lengths L1, L2, Ln.

Figure 7:
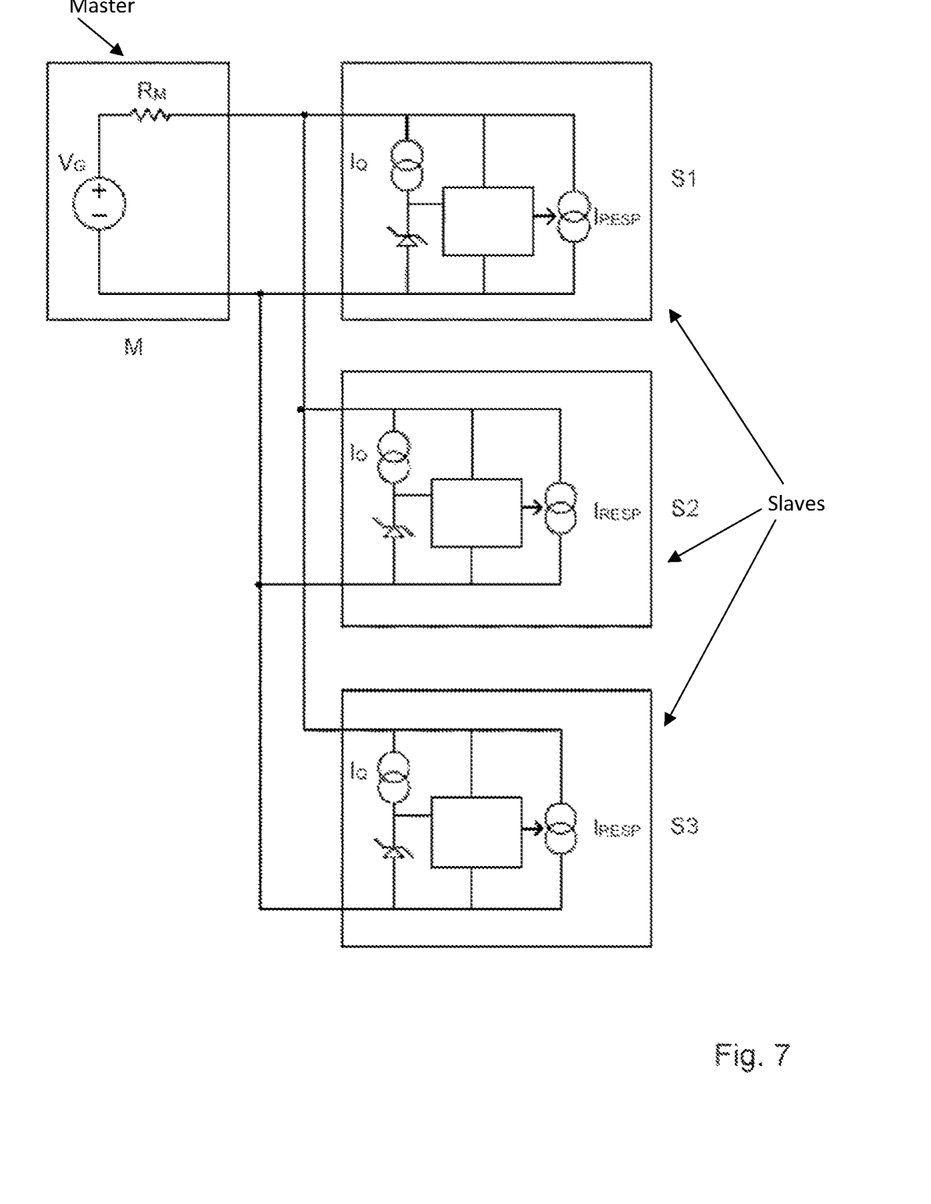
FIG. 7 shows a simplified schematic representation of an example implementation of a DSI3/PSI5 protocol (from the DSI3 standard)

An example implementation of a DSI3/PSI5 protocol from the DSI3 standard, having a master M and three slaves S1-S3, is depicted in FIG. 7. In the case of the DSI3 protocol, a voltage modulation is utilized in the direction of the bus subscribers 2 and a current modulation is utilized in the reverse direction. In principle, this allows simultaneous transmission in both directions, since both quantities are orthogonal, i.e., independent of one another. A loopback can take place here at the respective bus subscriber by directly controlling the return channel (current source $I_{RESP}$) from the signal of the controller (voltage swing of $V_O$) or of the control device 1.

Figure 8:
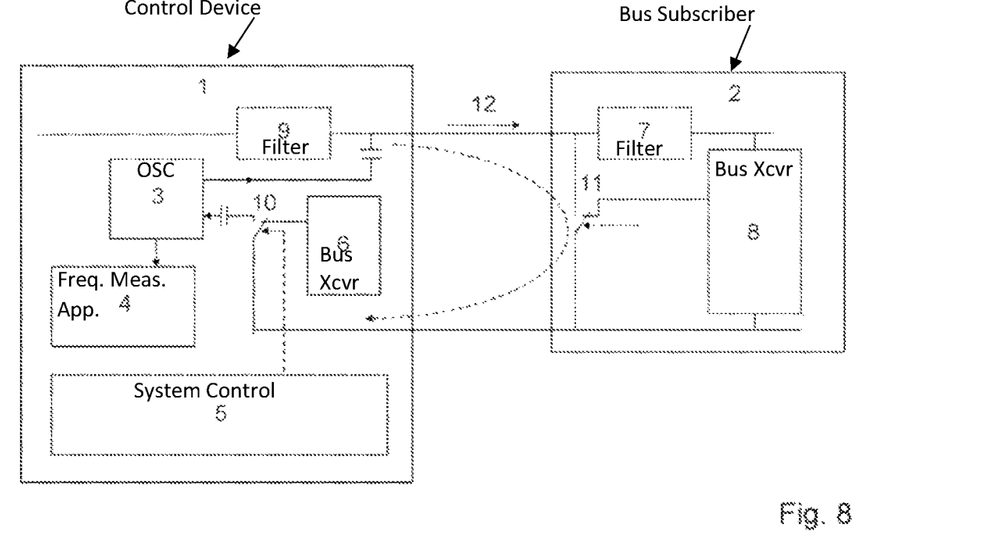
FIG. 8 shows a simplified schematic representation of a further embodiment of a control device and of a bus subscriber, the installation position of which is automatically detected by means of the method according to the invention.

An embodiment of a modulation of the supply line, the oscillator signal being superimposed with the supply voltage of the bus subscriber 2 or the bus subscribers (DC with superimposed oscillator signal 12), in order to subsequently feed this back by means of electronic switches or switching apparatuses 10, 11 ("Neutral"/"Loopback" switch) via the signal line of the bus, is depicted in FIG. 8. The supply voltage and signal are separated by means of simple capacitors; on the DC side by (relatively small) inductors.

Figure 9:
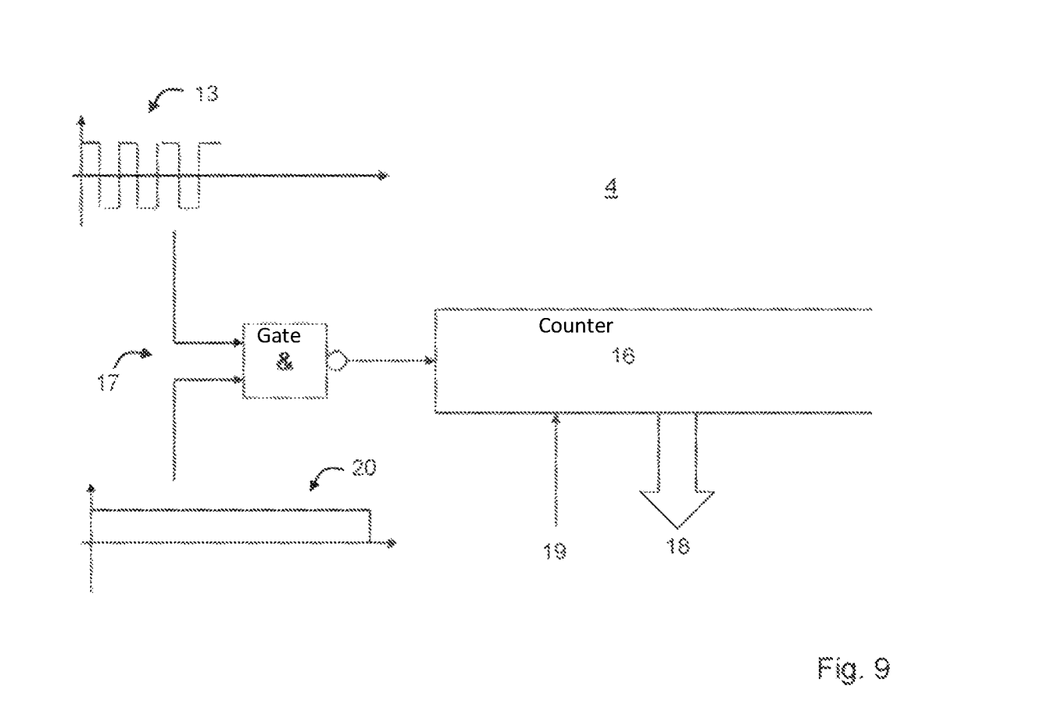
FIG. 9 shows a simplified schematic representation of an embodiment of a frequency measuring apparatus for executing the method according to the invention.

FIG. 9 shows an example of a frequency measuring apparatus 4, in which this is realized by a simple counter circuit 16 having sufficient width (e.g., 48 bits), in that the counter circuit 16 is supplied with the received pulses of the oscillator or the oscillator signal 13 via a gate circuit 17. The pulses are released for the duration of the measurement (measurement time 20) to the counter or to the counter circuit 16 via the second input of the gate circuit 17, and moreover blocked. The number of pulses counted within the measurement time 20 is a measure of the oscillator frequency which can then be output via the output 18. Since only the relative differences of the measurements among themselves are an issue, the absolute duration of the measurement is not critical; the only critical factor is their repeatability over several measurements of a measurement cycle (usually a few seconds). However, this goal can be achieved by means of conventional timer/counter assemblies of a controlling microcontroller or comparable timer circuits. Furthermore, a reset input or reset 19 is provided, by means of which, e.g., an (automatic) reset function or a resetting or restarting of the frequency measuring apparatus 4 can be brought about.

LIST OF REFERENCE NUMERALS

1 Control device
2, 2a, 2b, 2n Bus subscriber
3 Oscillator
4 Frequency measuring apparatus
5 System control
6 Bus transceiver
7 Filter for supply
8 Bus transceiver
9 Filter for supply
10 Switching apparatus
11 Switching apparatus
12 DC with superimposed oscillator signal
13 Oscillator signal
14 Inverter gate
15 AND gate
16 Counter circuit
17 Gate circuit
18 Output
19 Reset
20 Measuring time
A1, A2, An Address
L, L1, L2, Ln Line length
P1, P2, Pn Position
F, F1, F2 Frequency
M Master
S1, S2, S3 Slave

The invention claimed is:

1. A method for detecting the position of a bus subscriber of a bus system, in which
   a control device and several bus subscribers are provided, wherein
   the bus subscribers are respectively in a position to be detected and
   are connected to the control device via at least one line, wherein
   the line to the respective bus subscriber has a definable line length, and
   the position of a bus subscriber is then detected in that
   the control device emits a signal by means of an oscillator via the line to the respective bus subscriber and the bus subscriber responds, wherein
   the frequency of the oscillator is determined, and
   a ratio of frequency and line length is used to detect the position.

2. The method according to claim 1, wherein the bus subscriber is an actuator or a sensor, in particular an ultrasonic sensor.

3. The method according to claim 1, wherein the bus subscribers each have definable different line lengths.

4. The method according to claim 1, wherein the oscillator is a ring oscillator.

5. The method according to claim 1, wherein the control device comprises a frequency measuring apparatus having a counter circuit and a gate circuit for establishing the frequency of the oscillator.

6. The method according to claim 1, wherein the control device and the bus subscriber each have a bus transceiver for coupling in or feeding back the signal of the oscillator.

7. The method according to claim 1, wherein the oscillator signal, superimposed with the supply voltage of the bus subscriber, is coupled into the bus system, and fed back via a signal line of the bus system.

8. The method according to claim 1, wherein the control device and/or the bus subscriber has/have a switching apparatus, by means of which it can be decided whether a coupling in or feeding back of the signal of the oscillator takes place or not.

9. The method according to claim 1, wherein the ratio of frequency and line length can be derived by comparing the frequencies of the respective bus subscribers and assigned according to their sizes in accordance with the respective line lengths.

10. The method according to claim 1, wherein the bus subscriber, the position of which is to be detected, is placed in a state in which the position can be detected, while the remaining bus subscribers are placed in a state in which their position cannot be detected.

11. A method for detecting the position of a bus subscriber of a bus system, according to claim 1, wherein the method comprises the following steps:
   configuring a bus subscriber in a loopback state for a time period $T_{LB}$,
   configuring the remaining bus subscribers in a neutral state for a time period $T_{NEU}$, activating the oscillator for a time period $T_{OS}$ which is less than the periods of time $T_{LB}$ and $T_{NEU}$, establishing the resulting frequency while the oscillator is active.

12. The method according to claim 11, wherein the method further comprises:

applying a correction factor read out by the bus subscriber, as well as storing the result for later evaluation.

13. The method according to claim 11, wherein the method steps are carried out for all of the bus subscribers of the bus system.

14. The method according to claim 12, wherein the stored method steps are in particular arranged in an ascending or descending order and are assigned to the respective bus subscribers in accordance with their line lengths.

15. A bus system having position detection of bus subscribers, on the basis of a method according to claim 1, comprising:

a control device, several bus subscribers which are in a position to be detected, and the bus subscribers are connected to the control device via at least one line, wherein the line to the respective bus subscriber has a definable line length, and the position of a bus subscriber is detected in that the control device comprises an oscillator which emits a signal via the line to the respective bus subscriber and the bus subscriber responds, wherein a frequency measuring apparatus for establishing the frequency of the oscillator is provided, and a ratio of frequency and line length is used to detect the position.

* * * * *